United States Patent [19]

Inoue et al.

[11] Patent Number: 4,836,994
[45] Date of Patent: * Jun. 6, 1989

[54] CALCIUM-PHOSPHORUS-APATITE HAVING NOVEL PROPERTIES AND PROCESS FOR PREPARING THE SAME

[75] Inventors: Senya Inoue, Kasukabe; Akira Ono, Adachi, both of Japan

[73] Assignee: Kanto Kagaku Kabushiki Kaisha, Tokyo, Japan

[ * ] Notice: The portion of the term of this patent subsequent to Dec. 8, 2004 has been disclaimed.

[21] Appl. No.: 95,222

[22] Filed: Sep. 11, 1987

Related U.S. Application Data

[63] Continuation of Ser. No. 893,324, Jul. 30, 1986, Pat. No. 4,711,769.

[30] Foreign Application Priority Data

Dec. 18, 1984 [JP] Japan ................................ 59-265270
Mar. 1, 1985 [JP] Japan ................................. 60-38655
Sep. 20, 1985 [JP] Japan ............................... 60-206693
Nov. 11, 1985 [JP] Japan ............................... 60-250925

[51] Int. Cl.$^4$ ...................... C01B 15/16; C01B 25/26
[52] U.S. Cl. .................................... 423/308; 423/305; 423/309; 423/311

[58] Field of Search ................. 423/305, 308, 309, 311

[56] References Cited

U.S. PATENT DOCUMENTS

3,023,083 2/1962 Rodis et al. .......................... 423/315
4,481,175 11/1984 Iino et al. ............................ 423/308
4,711,769 12/1987 Inoue et al. ......................... 423/308

*Primary Examiner*—Gregory A. Heller
*Attorney, Agent, or Firm*—Birch, Stewart, Kolasch & Birch

[57] ABSTRACT

The present invention relates to a process for preparing a calcium-phosphorus-apatite, essentially characterized by admixing a single solvent of water or an organic solvent compatible with water or a mixed solvent of water with an organic solvent compatible with water with calcium and phosphorus compounds soluble in said single or mixed solvent to prepare a raw material solution, and atomizing the raw material solution into a flame or a heating zone for effecting a thermal decomposition reaction thereof to form a calcium-phosphorus-apatite; a calcium-phosphorus-apatite obtained by the process and having novel characteristics; and the use of the calcium-phosphorus-apatite as a chromatographic packing material.

21 Claims, 4 Drawing Sheets

Time (Minute)

CALCIUM-PHOSPHORUS-APATITE HAVING NOVEL PROPERTIES AND PROCESS FOR PREPARING THE SAME

This application is a continuation of copending application Ser. No. 893,324, filed on July 30, 1986, now U.S. Pat. No. 4,711,769.

Technical Field

The present invention relates to a calcium-phosphorus-apatite, a process for preparing the same, and a chromatographic packing material consisting of the same. More specifically, the present invention relates to a process for preparing a calcium-phosphorus-apatite having a controlled Ca/P ratio according to a method involving fast thermal decomposition of atomized solution.

The calcium-phosphorus-apatite of the present invention provides a spherical hydroxyapatite suitable as a packing material for high-performance liquid chromatography and an apatite of submicrons in size, suitable as a powder of raw material for bioceramics.

BACKGROUND ART

Calcium-phosphorus-apatites have a peculiar performance as adsorbents for biopolymers, fluorine ions, heavy metal ions, etc. They have recently been regarded as useful as a chromatographic packing material for separation of proteins and enzymes with utilization of bioaffinities thereof. They have also attracted attention as substances capable of being used as bioceramic materials for artificial bones and teeth.

Processes for preparation of these apatites have been known for a long time. According to a rough classification, however, the following processes can be exemplified.

(1) Processes involving direct precipitation with ions in an aqueous solution, which are called wet synthesis processes.

A. Tiselius et al. developed a hydroxyapatite preparation technique according to the wet precipitation reaction process [Arch. Biochem. Biophys. 65, 132-155 (1956)]. Moreno et al. presented the conditions for synthesis of a hydroxyapatite with a Ca/P ratio of 1.67 [E. C. Moreno et al., J. Res. Natl. Bur. Stand. 72 A(6), 773-82 (1968)]. The results of an experiment following the above-mentioned conditions by Larsen et al. were reported [S. Larsen et al., Experientia 27 (4), 483-85 (1971)].

In these wet synthesis processes, it is difficult to consistently obtain a precipitate having a composition with the ratio of formulation, due to a very large number of factors, including the kinds and concentrations of raw material salts, the procedure and rate of mixing, and the pH adjustment in the step of mixing an aqueous solution of a calcium salt with an aqueous solution of a phosphorus compound to form the precipitate according to a direct ionic reaction for crystallization into an apatite. Therefore, a serious difficulty is encountered in controlling the atomic ratio Ca/P of calcium and phosphorus and the physiochemical properties of the formed powder with good repeatability. Moreover, many steps involving filtration, washing, drying, and pulverization of the precipitate are needed together with many apparatuses therefor, and the operations require much skill, thus presenting a number of difficulties.

(2) Processes involving a solid diffusion reaction, which are called dry synthesis processes.

These processes are suitable for synthesis of hydroxyapatite having a stoichiometrical composition, which is hard to prepare according to any process as mentioned in (1). Fowler synthesized hydroxyapatites of alkaline earth metal according to a solid reaction of a calcium, strontium, or barium salt of pyrophosphoric acid or carboxylic acid [B. O. Fowler, Inorg. Chem. 13 (1), 207-14 (1974)]. Since the reaction according to the dry synthesis process must be continued at high temperature for a long period of time, however, large energy is disadvantageously consumed. Further, a difficulty in obtaining a homogeneous composition ensues from the solid-solid reaction.

(3) Processes involving a high pressure reaction, which are called hydrothermal synthesis processes, and which are performed mainly for the purpose of obtaining large crystals.

Problems such as use of expensive apparatus and complicated operations are involved in these hydrothermal processes because the reaction is performed under high pressure.

Columns packed with hydroxyapatite have recently been marketed. This has enabled biopolymers of $10^5$ daltons or more to be separated and purified, which was previously impossible. Thus, they have been attracting attention as meeting industrialization of biotechnology requiring separation and purification of proteins, nucleic acids, enzymes, etc.

However, prior art packing materials consisting of hydroxyapatite are low in mechanical strength, liable to be divided into fine particles, poor in the repeatability of packing properties and chromatographic properties, and also, poor in durability or short in life span, leading to high cost, thus presenting various disadvantages. Therefore, they have not yet been widely employed, despite their excellent properties concerning separation and purification of biopolymers. Thus, removal of their disadvantages has been seriously demanded.

Specifically, since the conventional hydroxyapatite is prepared by the so-called wet synthesis process, control of the Ca/P ratio is difficult and removal of the phosphoric acids is insufficient, leading to disadvantages such as low resistance to strong alkalis as well as organic solvents.

Atkinson et al. synthesized a hydroxyapatite by a wet hydrolysis process and reported its aptitude for chromatography [A. Atkinson et al., J. Appl. Chem. Biotechnol. 23 (7), 517-529 (1973)]. However, the hydroxyapatite synthesized by the hydrolysis process is liable to form coarse particles due to aggregation of fine crystals under the influence of the particle form of a raw calcium phosphate material as well as idiomorphic crystals. These particles are defective in being liable to be finely divided because of the poor mechanical strength thereof during packing under high pressure and measurement work. As well, they are poor in flowability during packing since they are a powder consisting of aggregates of fine particles. Moreover, a serious difficulty is encountered in densely packing the packing material particles under the action of high pressure for providing uniformity of spaces between the packing material particles because of the above-mentioned poor mechanical strength of the particles. In addition, special attention must be paid to handling of the packed column for avoiding any change in the packing state in the column. Thus, many difficulties in the practical use of the packing material particles are involved.

A raw material powder of an apatite for preparation of a high density hydroxyapatite ceramic must be excellent in thermal stability since a molding thereof is to be sintered at high temperature. In this respect, an apatite having the same atomic ratio of calcium to phosphorus as the theoretical composition ratio is desirable. In this sense, an apatite prepared by the dry synthesis process capable of easily providing an apatite with the theoretical composition may be suitable as the raw material of ceramics. Since the apatite prepared by the dry synthesis process has already undergone the high temperature reaction for the apatite synthesis, the sintering activity of a powder thereof pulverized as the raw material of ceramics is low because of the thermal history of the apatite. Accordingly, sintering must be carried out at a higher temperature in order to obtain a dense sintered body. This is accompanied by such a disadvantage that the proportion of apatite decomposition increases with an increase in the temperature.

According to U.S. Pat. No. 4,097,935, a high density hydroxyapatite ceramic is obtained by forming a gelatinous precipitate of calcium phosphate in a solution having a pH of 10 to 12 by the precipitation process, and separating and sintering the same. As described above, however, the wet synthesis process is affected by a number of factors, so that a difficulty is experienced in controlling the process with good repeatability.

As a result of extensive investigations on the process for preparing a calcium-phosphorus-apatite in a simple manner with a few steps while obviating the defects of the prior art techniques as mentioned above, we have completed the present invention.

According to the present invention, there is provided a process for preparing a calcium-phosphorus-apatite in a manner quite different from those of the above-mentioned prior art techniques, and a calcium-phosphorus-apatite having novel properties which is obtained according to this process.

DISCLOSURE OF INVENTION

In one aspect of the present invention, there is provided the following novel process for preparing a calcium-phosphorus-apatite.

In the process of the present invention, homogeneous mixture of raw materials is materialized by dissolving solvent-soluble raw materials in a single solvent of water or an organic solvent compatible with water or a mixed solvent of water or an organic solvent compatible with water to prepare a raw material solution for use in the process. Therefore, the process is characterized by the presence of no precipitate in the mixture.

Raw material solutions to be used in the reaction of fast thermal decomposition of atomized solution in the process of the present invention are roughly classified as follows:

(a) Acidic raw material solutions prepared by adding inorganic calcium and phosphorus compounds both soluble in the following solvent and, if necessary, an acid to a single solvent of water or an organic solvent compatible with water or a mixed solvent of water with an organic solvent compatible with water and mixing them to effect dissolution.

(b) Raw material solutions prepared by adding an inorganic calcium compound and an organic phorphorus compound both soluble in the following solvent and, if necessary, a member selected from ammonium chloride and ammonium bromide to an organic solvent compatible with water or a mixed solvent of water with an organic solvent compatible with water, and mixing them to effect dissolution for providing a homogeneous composition.

(c) Raw material solutions prepared by adding an inorganic calcium compound and an organic phosphorus compound both soluble in the following solvent to and mixing with an organic solvent compatible with water or a mixed solvent of water with an organic solvent compatible with water to effect dissolution, and allowing or causing aqueous ammonia and/or an amine soluble in the resulting solution to exist in the solution.

Preparation of each type of the above-mentioned raw material solutions will now be specifically described.

(1) In preparation of a raw material solution of the above-mentioned type (a), usable inorganic calcium and phosphorus compounds include $Ca(NO_3)_2 \cdot 4H_2O$, $Ca(CH_3COO)_2 \cdot H_2O$, $CaCl_2 \cdot 2H_2O$, $CaBr_2 \cdot 2H_2O$, $CaHPO_4 \cdot 2H_2O$, $NH_4H_2PO_4$, $NH_4H_2PO_3$, $NH_4H_2PO_2$, $H_3PO_4$, $H_3PO_3$, and $H_3PO_2$, while preferably usable organic solvents include alcohols ketones, hydroxyketones and carboxylic acids, including lower alcohols having 1 to 5 carbon atoms, lower dialkylketones, di- or tri-hydric lower alkanols and lower alkoxyl lower alkanols. Specific usable solvents are those such as methanol, ethanol, and isopropanol; and acetone, 2-methoxyethanol, ethylene glycol, 2-ethoxyethyl acetate, propionic acid, diacetone alcohol, dimethylacetamide, 2-butanone, and 4-methyl-2-pentanone. These mentioned are not particularly limitative. Any combination of raw materials may be used in so far as it can provide a homogeneous solution free from precipitation by mixing. Nitric acid and hydrochloric acid are preferred as the acid that may be added if necessary for providing such a homogeneous solution. For example, nitric acid is preferred as the acid that may be used in synthesis of hydroxyapatite, while hydrochloric acid may be used instead of nitric acid in synthesis of an apatite containing chlorine. The process of the present invention uses, as the solvent, water alone, an organic solvent alone as mentioned above as being compatible with water, or a mixed solvent of water with an organic solvent compatible with water, which is chosen depending on the manner of thermal decomposition, the combination of raw materials, and the desired apatite powder characteristics. In the case of using only an organic solvent compatible with water, there is a possibility dependent on the combination of raw material compounds that the reaction system becomes one of a mixed solvent of water with the organic solvent as a result of incorporation therein of the residual water, water of crystallization, or the like of any raw material compound. In any case, however, such an organic solvent can be used in the process of the present invention in so far as a raw material solution can be prepared without precipitation.

(2) Examples of the above-mentioned organic phosphorus compound to be used in preparation of a raw material solution of the above-mentioned type (b) include $(CH_3O)_3P$, $(C_2H_5O)_3P$, $[(CH_3)_2CHO]_3P$, $[CH_3(CH_2)_3O]_3P$, $(C_6H_5)_3P$, $(C_2H_5O)_2POH$, and $(C_6H_5)_3PO$. $Ca(NO_3)_2 \cdot 4H_2O$, $CaCl_2 \cdot 2H_2O$, and $CaBr_2 \cdot 2H_2O$ can be mentioned as usable inorganic calcium compounds. Alcohols such as methanol, ethanol, and isopropanol; acetone, etc. can be used as the inflammable organic solvent. These are not particularly limitative. Any combination of an inorganic calcium compound, an organic phosphorus compound, and an organic solvent may be used in so far as it can provide a homogeneous solution composition free from precipitation. Since calcium nitrate, calcium chloride, calcium bromide, etc. usually include water of crystallization, a small amount of water comes to exist in the system even if a mixed solvent containing water is not used. The raw materials to be used may be chosen in accordance with a desired calcium-phosphorus-apatite product. For example, in the case of synthesis of hydroxyapatite, a calcium nitrate salt such as $Ca(NO_3)_2.4H_2O$ may be used as the calcium salt. In the case of synthesis of chloroapatite, use of $CaCl_2.2H_2O$ or combined use of $Ca(NO_3)_2.4H_2O$ and $CaCl_2.2H_2O$, or $Ca(NO_3)_2.4H_2O$ and $NH_4Cl$ may be made to provide chloroapatite or an apatite solid solution of chloroapatite with hydroxyapatite. In the case of synthesis or bromoapatite, similar use of $CaBr_2.2H_2O$ or similar combined use of $Ca(NO_3)_2.4H_2O$ and $CaBr_2.2H_2O$, or $Ca(NO_3)_2.4H_2O$ and $NH_4Br$ may be made to provide bromoapatite or an apatite solid solution of bromoapatite with hydroxyapatite.

(3) In preparation of a raw material solution of the above-mentioned type (c), usable calcium and phosphorus compounds as mentioned above include $Ca(NO_3)_2.4H_2O$, $(CH_3O)_3P$, $(C_2H_5O)_3P$, $[CH_3(CH_2)_3O]_3P$, and $(C_2H_5O)_2POH$, while usable organic solvents include alcohols such as methanol and ethanol, and mixed solvents of water with an organic solvent as mentioned above. Triethylamine, tri-n-butylamine, etc. can be preferably used as the amine that may be added to the solution containing an inorganic calcium compound and an organic phorphorus compound dissolved in such a solvent. Incorporation of ammonia in the above-mentioned solution may be made by adding aqueous ammonia thereto or by blowing an ammonia gas thereinto to dissolve the same in the solution. The presence of such aqueous ammonia or an amine suppresses liberation formation of CaO or $CaCO_3$ to provide an effect of increasing the apatite yield, which is particularly notable in synthesis of hydroxyapatite.

Even where an organic solvent compatible with water is used as the sole solvent in a raw material solution as mentioned in (b) or (c), there is a possibility dependent on the combination of raw material compounds that the reaction system becomes one of a mixed solvent of water with the organic solvent as a result of incorporation therein of the residual water, water of crystallization, or the like of any raw material compound. In any case, however, such an organic solvent can be used in the process of the present invention in so far as the raw material solution can be prepared without precipitation.

According to the process of the present invention, maintenance of homogeneity of the composition from the stage of the raw material solution to the stage of the product is attained by minimizing volumes wherein segregation of the components of the solutions occurs according to the process involving fast thermal decomposition of atomized solution to rapidly effect vaporization and combustion of the solvent, thereby to minimize segregation of the components in the droplets of the solution.

The above-mentioned process according to the present invention will now be more specifically described.

Calcium and phosphorus compounds both soluble in the following solvent are added to and mixed with a single solvent of water or an organic solvent compatible with water or a mixed solvent of water with an organic solvent compatible with water to dissolve the whole.

Thus, a raw material solution as the starting material is prepared. The order of mixing of the raw materials in preparation of the solution is not necessarily limited to the one mentioned above. Mixing may be done in any order in so far as a mixture solution free of a precipitate can be obtained. Sometimes, depending on the combination of calcium and phosphorus compounds and a solvent in the above-mentioned raw material solution, a difficulty may be encountered in preparing a homogeneous solution or a once prepared solution may turn turbid with the lapse of time. In such a case, addition of an acid can occasionally solve the problem. Where an organic compound is used as the phosphorus compound, preliminary addition of aqueous ammonia to the solution may occasionally effectively suppress formation of any by-product and liberation of CaO, and improve the yield of hydroxyapatite. Thus, an acid or aqueous ammonia may be added to the solution according to need. The mixing period of time is different depending on the raw materials chosen. In any way, stirring is continued enough until all the raw materials are dissolved to form a homogeneous solution composition. Subsequently, the solution thus prepared is atomized into a flame coming from a gas burner or the like, or into a heating zone preliminarily heated at a desired temperature falling within a temperature range capable of causing thermal decomposition of the raw material solution by means of a gas furnace, an electric furnace, or a high temperature gas according to a known atomization method using a pressure nozzle or a rotary disk. In this way, the solution atomized into fine droplets of usually several microns or smaller is subjected to not only vaporization and combustion of the solvent therein but also solidification and thermal decomposition of the solute within a very short period of time of several seconds or less. Where an inflammable organic solvent compatible with water or a mixed solvent of water with an inflammable organic solvent compatible with water is used as the solvent, the combustion heat generated by combustion of the inflammable organic solvent itself can be utilized as a heat source necessary for the thermal decomposition reaction. Where the organic solvent in the mixed solvent of water with the organic solvent compatible with water is utilized without combustion thereof for promoting evaporation of the mixed solvent, or where water is used as the sole solvent, a source of heat supply, such as a gas furnace as mentioned above, is needed. A combination of the combustion heat generated from the organic solvent and a heating source such as a gas furnace may be employed. A powder formed by the thermal decomposition reaction is collected by means of, for example, a cyclone system.

The powder formed by the fast thermal decomposition reaction of atomized solution involves such various possibilities, depending on the kinds and combination of raw material compounds and the conditions of fast thermal decomposition of atomized solution, that it may consist of an amorphous phase, or it may include both an apatite crystalline phase and an amorphous phase, or it may contain unreacted components and/or by-products in addition to an apatite. In any case, it is a highly reactive powder. The use of such a highly reactive powder may be desired in some end uses of the powder or for some purposes of use of it. In other end uses or for other purposes, there may arise desires to reduce the reactivity, increase the crystallinity, and/or decrease or eliminate the unreacted components and/or the by-products. In this case, the powder formed by the fast thermal decomposition reaction of atomized solution is heat-treated in an atmosphere such as air, air containing water vapor incorporated therein, or an inert atmosphere at a desired temperature falling within a temperature range capable of allowing the apatite to stably exist without decompositon thereof to obtain an apatite controlled in various powder characteristics such as the degree of crystallinity.

For example, in the case of hydroxyapatite, the above-mentioned purpose can be attained by a heat treatment conducted in air at a desired temperature of 1,400° C. or lower.

In the case of chloroapatite, adequate choice of the conditions of preparation of the raw material solution and the conditions of fast thermal decomposition of atomized solution can provide a product, which can be converted, upon heating to a temperature in a range of 500° to 1,000° C., into calcium chlorophosphate ($Ca_2PO_4Cl$) capable of being converted into chloroapatite again at a temperature of 1,000° C. or higher. Accordingly, also in this case, chloroapatite can be obtained by an adequate heat treatment.

The apatite prepared by the process of the present invention will be described. The atomic ratio Ca/P of calcium to phosphorus is 5/3 in the common calcium-phosphorus-apatite having a stoichiometric composition. Where the raw material solution (a) as mentioned above is used in the actual reaction according to the present invention, a composition of raw material solution having an atomic ratio Ca/P of calcium to phosphorus of 1.60 to 1.85 always provides a product comprising an apatite as the main component. It is also confirmed through experiment that in some cases a product comprising an apatite as the main component is obtained even at a Ca/P of less than 1.60 or more than 1.85, although it depends on the combination of raw materials. In the same way, a composition having an atomic ratio Ca/P of calcium to phosphorus of 1.25 to 1.75, in the case of the raw material solution (b) as mentioned above, or 1.45 to 1.85, in the case of the raw material solution (c) as mentioned above, always provides a product comprising an apatite as the main component. It is also confirmed through experiment by the inventors of the present invention that in some cases a product comprising an apatite as the main component is obtained even at a Ca/P falling outside the above-mentioned range though it depends on the combination of raw materials. Thus, when the Ca/P ratio is beside 5/3, some unreacted components and/or by-products may be incorporated in the product depending on the conditions. However, the above-mentioned product is still usable in some cases since the performance thereof may be sufficient in some end uses or for some purposes. Therefore, the above-mentioned product, of course, falls within the scope of the calcium-phosphorus-apatite according to the present invention.

The powder formed by the foregoing process according to the present invention can have various forms such as a fine powder of hollow spheres, a fine powder of spheres solid up to the inside thereof, or a powder of broken spheres having one or various shapes, depending on the kinds and combination of raw material compounds chosen and the choice of conditions of fast thermal decomposition of atomized solution. These forms of powders can be suitably employed in various end uses in accordance with their respective characteristics such as the shape.

As will be described in detail in Examples hereinafter a powder product of apatite particles having a spherical shape of submicrons to tens of microns can be directly prepared without any molding operation by adequately choosing the conditions of fast thermal decomposition of atomized solution, such as the rate of supply of a raw material solution, the gas atomization pressure, the rate of supply of an atomization gas, and the thermal decomposition temperature, in accordance with the kinds and combination of raw material compounds and a solvent. The spherical particles thus obtained are not only in the most desirable form of packing material particles for chromatography but also very excellent in chromatographic properties. Thus, the apatite particles having novel properties not only can advantageously be directly prepared in the form of spheres of about several microns, unattainable by the conventional techniques, without any molding operation, but also have many excellent characteristics required of the packing material, such as excellent chemical stability, very high mechanical strength, and excellent durability because of easy control of the Ca/P ratio in the process.

The spherical apatite particles of submicrons to tens of microns prepared by the above-mentioned process can be used as the column packing material either as they are or after they are classified for further uniformizing the particle size.

Since the particle shape of the above-mentioned apatite is spherical, the flowability of the particles during packing thereof is so good that a bridging phenomenon, which is liable to occur when angular particles are packed, does not occur. Thus, a uniformly packed column is easily prepared only by performing packing work in accordance with the ordinary packing procedure. When spherical particles having uniform particle size and shape are packed, not only is the packing work well facilitated, but also very uniform inter-particle spaces are formed by uniformly packing the apatite particles. This provides a characteristic feature of elimination of the dispersion of the inter-particle spaces, which gives rise to turbulence to provide such a difference in the linear flow rate of an elute in the axial direction of a column as will constitute one cause of reduction in the separating capacity of the column.

Minimization and uniformization of the size of particles have been materialized to some extent also as regards the hydroxyapatite packing material prepared by the conventional technique. Also as for column packing, attempts to minimize the dispersion of spaces between packing material particles have been made with the greatest circumspection. Despite such efforts, the dispersion of the inter-particle spaces could not have been perfectly eliminated in the hydroxyapatite packing material prepared by the conventional technique because application of a pressure high enough to realize uniform packing is impossible owing to the poor mechanical strength of the packing material as well as the particle shape of the packing material which may be any one of various shapes including aggregates of fine plate crystals and aggregates of fine pillar-like crystals.

The fine spherical apatite prepared by the foregoing process has a practical, significant advantage in that packing work and handling of a packed column are very well facilitated since it has such a very high mechanical strength that the densely packed particles thereof are not broken even under a packing pressure of, for example, 500 kg/cm². An increase in the separating capacity in column chromatography can be materialized by strictly minimizing the particle size of the packing material. However, packing of minute particles entails narrower inter-particle spaces in the column, which results in a marked reduction in the flow rate. This problem is acutally solved by a method in which the flow rate is increased by application of high pressure to the column. This results in application of a considerable pressure to the packing material.

Therefore, when the mechanical strength of packing material particles in use is low, packed particles are broken and hence pulverized during packing and/or measurement work to cause blocking of the column, which shortens the life span of the column. As opposed to the conventional hydroxyapatite disadvantageously consisting of aggregates of fine plate crystals and hence having liability to collapse, the packing material according to the present invention consists of particles having a very high mechanical strength. Thus, the above-mentioned problem can be solved at a stroke.

The apatite used in the present invention not only consists of spherical particles having a high mechanical strength as described above, but also has an easy controllability in the Ca/P ratio. Therefore, it is excellent in chemical stability and is resistant to organic solvents and strong alkalis, and as well it is not liable to be pulverized during service thereof. Thus, the use of the apatite having very high physical and chemical stabilities can provide a column having good repeatability of packing and hence good repeatability of chromatographic characteristics such as retention time and retention capacity as well as high durability assuring repeated services thereof. This enables the life span of the apatite column to be prolonged, and, hence, is very effective in the reduction of the cost concerning the use of the column, thus presenting a great practical significance.

Furthermore, adequate choice of the kinds and combination of raw material compounds and solvent, and the conditions of fast thermal decompositon of atomized solution, for example, such conditions as will break the spherical shape of minute droplets atomized, heated, and solidified in the course of thermal decomposition thereof, enables formation of an apatite consisting of hollow particles each having a weak and hence easily collapsible, spherical husk, or particles formed by collapse thereof. When these particles thus formed are further heat-treated in a temperature range of about 1,000° to 1,300° C., a sintered body having a form of rice grain-like particles of submicrons in size mutually connected is formed through crystal growth and sintering. This sintered body is either one consisting of particles having a hollow network structure or one consisting of massive particles according to rough classification by preparation conditions. This product of the heat treatment can be easily pulverized to rice grain-like particles of submicrons in size by a known method using a turbine mixer, a ball mill, or the like.

The apatite powder thus obtained not only has a characteristic feature that it consists of fine particles in the order of submicrons, having a sharp particle size distribution, but also can be easily prepared as an apatite of a stoichiometrical composition having a high stability against heat decomposition during the course of sintering since the control of the Ca/P atomic ratio is easy as is apparent from the feature of the process of the present invention. Due to the above-mentioned characteristic features, the fine apatite in the order of submicrons obtained by the above-mentioned process, is desirable particularly as a raw material powder of bioceramics such as artificial bones and teeth.

The following striking effects can be attained by the process of the present invention.

(1) The synthesis reaction can be finished in a time as extremely short as at most several seconds by contrast with the conventional apatite synthesis requiring a long reaction time. Besides, a powder can be directly obtained without going through any complicated steps such as filtration, washing, and drying.

(2) A further heat treatment of a powder formed by fast thermal decomposition of atomized solution in an atmosphere such as air, air admixed with water vapor, or an inert atmosphere at a desired temperature falling in a temperature range allowing the apatite to stably exist without decomposition can allow the degree of crystallinity, degree of sintering, and mechanical strength of the powder to increase.

(3) The synthesis of an apatite containing a halogen such as chlorine or bromine can also be easily made according to the process of the present invention. For example, chloroapatite has hitherto been synthesized exclusively by a high temperature solid phase reaction or a pressurized hydrothermal reaction, and no normal pressure wet processes have been employed in the synthesis. In contrast, according to the process of the present invention, chloroapatite or an apatite solid solution of chloroapatite with hydroxyapatite can be easily synthesized using a raw chlorine-containing material such as $CaCl_2.2H_2O$ or $NH_4Cl$. Bromoapatite or an apatite solid solution of bromoapatite with hydroxyapatite can also be synthesized using $CaBr_2.2H_2O$ or $NH_4Br$.

(4) Thanks to one of the characteristic features of the process of the present invention that a raw material solution is atomized and thermally decomposed as such without precipitation of apatite-forming components therein, an apatite product having a composition ratio equal to a charge ratio of calcium to phosphorus in the raw material solution can be easily prepared. Therefore, not only can an aptite having a theoretical composition ratio [Ca/P=5/3], which is difficult to prepare by any wet process, be easily obtained, but also an apatite having an atomic composition ratio of calcium to phosphorus which is intentionally allowed, in accordance with the purpose and the end use thereof, to fall beside the theoretical composition ratio can be easily prepared. In other words, according to the process of the present invention, the atomic ratio of calcium to phosphorus in the apatite composition can be easily controlled with excellent repeatability.

(5) According to the process of the present invention, adequate choice of preparation conditions provides an apatite product in the form of a powder of fine spheres usually in the order of submicrons to tens of microns in size from the first. The particle size can be varied by adequate choice of the kinds of raw materials and the concentration of the solution in preparation of the raw material solution as well as the conditions of fast thermal decompositon of atomized solution. Thus, not only is there no time consumption in a pulverization step and no fear of incorporation of impurities during the step, but also an apatite product having an excellent packing characteristic due to the spherical form of the particles and/or an atomic ratio falling beside the theoretical composition ratio, which is materialized by making much of easiness in control of the atomic ratio of calcium to phosphorus, can be obtained. Such an apatite product can be suitable for use thereof as a highly surface-active adsorbent or catalyst, or a chromatographic filler.

(6) An apatite powder prepared by the process of the present invention can serve as a raw ceramic material powder having a high reactivity, an excellent sinterability, and a high thermal stability, since it has not yet experienced a thermal history of exposure to high temperatures for a long duration as experienced in the dry synthesis process. In this sense, the apatite prepared by the process of the present invention is suitable for use thereof as a raw material of bioceramics such as artificial bones.

MODES FOR CARRYING OUT THE INVENTION

The following Examples will illustrate the present invention in more detail, but should not be construed as limiting the scope of the invention.

EXAMPLE 1

Figure 1:
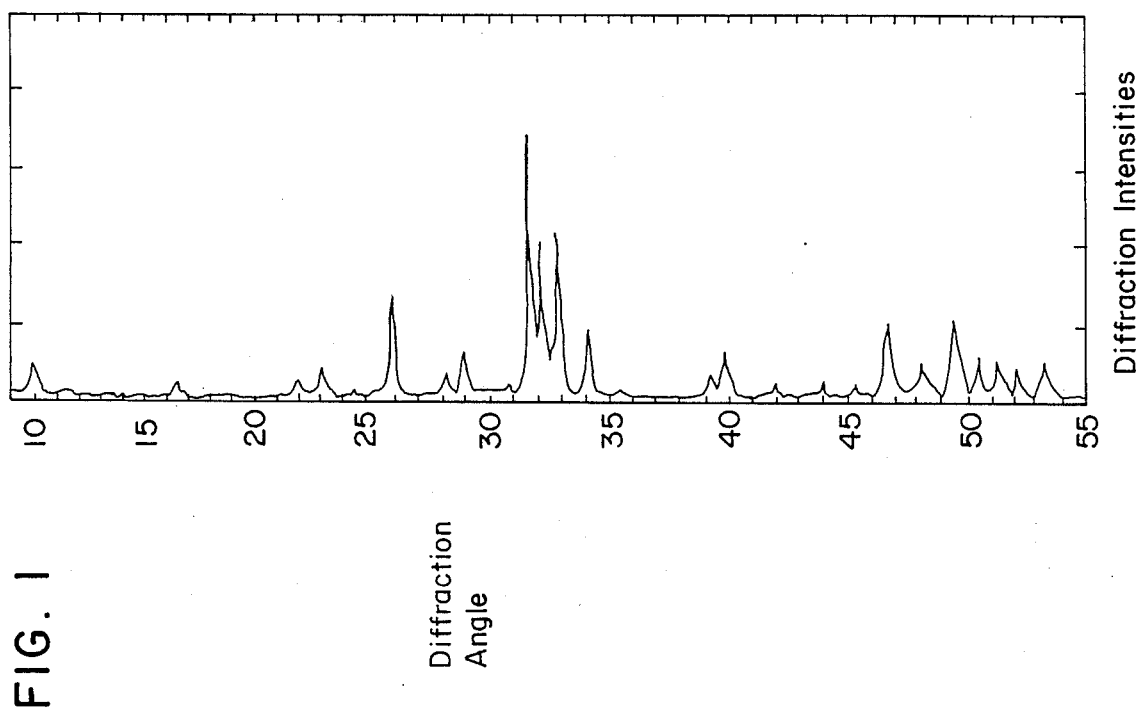
FIG. 1 is a diagram showing an X-ray diffraction pattern of a hydroxyapatite obtained by the process of Example 1 in accordance with the process of the present invention.

A solution of 3.11 g of $NH_4H_2PO_2$ dissolved in 35 ml of water was admixed with a solution of 14.76 g of $Ca(NO_3)_2.4H_2O$ dissolved in 50 ml of water, and then further mixed with 100 ml of ethanol by stirring to prepare a raw material solution. Subsequently, the raw material solution and pressurized air was supplied into a two fluid atomization nozzle at rates of 20 ml/min and 10 liter/min, respectively, and atomized into a flame coming from a gas burner. Fine droplets formed from the raw material solution were instantaneously heated by the solvent evaporated and burned in the flame, thereby to be thermally decomposed. The powder formed was collected by a cyclone system. The results of X-ray diffraction measurement of the formed powder are shown in FIG. 1. As is apparent from FIG. 1, the powder formed by the process of the present invention was a hydroxyapatite whose crystals were well grown. Three main peaks observed consist of a diffraction peak (211) at a diffraction angle 2 $\theta$ or 31.7°, a diffraction peak (112) at 2 $\theta$ of 32.2°, and a diffraction peak (300) at 2 $\theta$ of 32.9°.

EXAMPLE 2

A solution of 8.59 g of phosphoric acid ($H_3PO_4$ content: 85.6%) dissolved in 20 ml of water was added to a solution of 29.52 g of $Ca(NO_3)_2.4H_2O$ dissolved in 40 ml of water and admixed with 5 ml of nitric acid, and then further mixed with 120 ml of ethanol by stirring to prepare a raw material solution. Subsequently, the raw material solution was atomized into a flame in the same manner as in Example 1 to be thermally decomposed. The powder obtained by this process was found, as a result of X-ray diffraction measurement, to be one including a crystalline phase of hydroxyapatite and a small amount of an amorphous phase.

EXAMPLE 3

A powder as obtained by the process of Example 2 was heated at a rate of 5° C./min to 1,300° C., at which it was then heat-treated for 1 hour, followed by cooling at a rate of 5° C./min. The results of X-ray diffraction measurement of the product obtained by the heat treatment showed that the product was a hydroxyapatite whose crystals were better grown than those of the hydroxyapatite obtained in Example 2, and decomposition of which was not recognized even at high temperatures. Thus, it was confirmed that the heat treatment provides a hydroxyapatite having a high thermal stability, the crystals of which are well grown.

EXAMPLE 4

Figure 2:
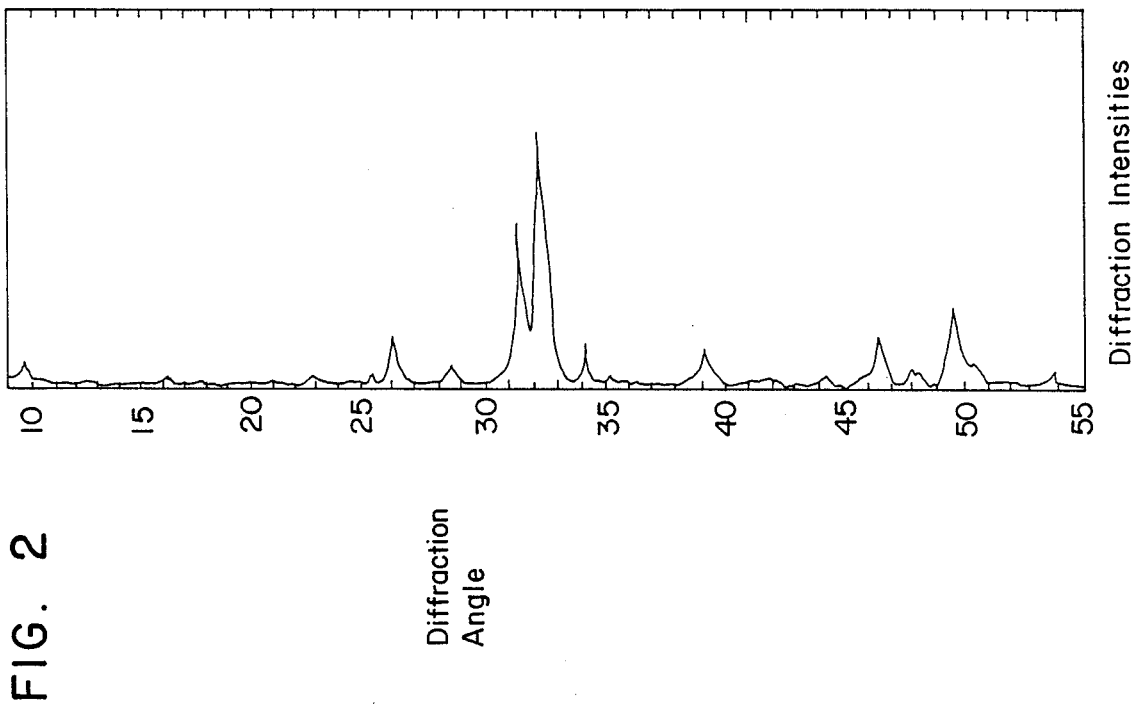
FIG. 2 is a diagram showing an X-ray diffraction pattern of a chloroapatite obtained by the process of Example 4 in accordance with the process of the present invention.

A solution of 8.63 g of $NH_4H_2PO_4$ dissolved in 20 ml of water and admixed with 5 ml of hydrochloric acid was added to a solution of 18.38 g of $CaCl_2.2H_2O$ dissolved in 35 ml of water and admixed with 5 ml of hydrochloric acid, and then further mixed with 120 ml of ethanol by stirring to prepare a raw material solution. Subsequently, the raw material solution was atomized into a flame in the same manner as in Example 1 to be thermally decomposed. The results of X-ray diffraction measurement of the powder obtained by this process are shown in FIG. 2. As is apparent from FIG. 2, the powder shows a diffraction pattern of chloroapatite. Main peaks observed are a diffraction peak (211) at a diffraction angle 2 $\theta$ of 31.4° and superposed diffraction peaks (112) and (300) at a diffraction angle 2 $\theta$ of 32.2°.

EXAMPLE 5

A solution of 4.31 g of $NH_4H_2PO_4$ dissolved in 35 ml of water was admixed with a solution of 14.76 g of $Ca(NO_3)_2.4H_2O$ dissolved in 50 ml of water and admixed with 5 ml of nitric acid to prepare a raw material solution. Subsequently, the raw material solution was atomized into a reaction tube (30 $\phi \times$ 1,000 mm) of an electric furnace, which was preliminarily heated to 1,200° C., from one end of the reaction tube at a rate of 2 ml/min. Fine droplets formed from the raw material solution were heated during passage thereof through the reaction tube to be thermally decomposed. The product was collected in a container connected to the other end of the reaction tube, while a gas and a water vapor formed by the thermal decomposition were aspirated by an aspirator to be discharged out of the system. As a result of X-ray diffraction measurement of the powder obtained by this process, the conjoint presence of a crystalline phase of hydroxyapatite and an amorphous phase, and a slight amount of calcium carbonate were recognized by the peaks assigned thereto.

EXAMPLE 6

3.08 g of phosphorus acid was dissolved in 190 ml of methanol. 6.94 g of $CaCl_2$ was dissolved in the resulting solution to prepare a raw material solution. Subsequently, the raw material solution was atomized into a flame in the same manner as in Example 1 to be thermally decomposed. The powder formed was heated up in an atmosphere of air at a rate of 5° C./min to 1,300° C., at which it was heat-treated for 1 hour, followed by cooling at a rate of 5° C./min. As a result of detection of chlorine by a silver nitrate solution and X-ray diffraction measurement of the powder obtained, it was confirmed that it was an apatite solid solution of hydroxyapatite with chloroapatite.

EXAMPLES 7 TO 17

Various calcium-phosphorus-apatites were obtained in Examples 7 to 17 in which the procedure of Example 1 or 5 was repeated using a raw material and a formulation as listed in Table 1. The heat decomposition temperature, the heat treatment conditions, and the main component are listed for each product in Table 1.

TABLE 1

| Raw Material | | 7 | 8 | 9 | 10 | 11 | 12 | 13 | 14 | 15 | 16 | 17 |
|---|---|---|---|---|---|---|---|---|---|---|---|---|
| Raw Material Formulation | | | | | | | | | | | | |
| (g) | | | | | | | | | | | | |
| $Ca(NO_3)_2.4H_2O$ | | 11.81 | 32.81 | 29.52 | 29.52 | 14.76 | 29.52 | — | — | 28.98 | 29.52 | 29.52 |
| $Ca(CH_3COO)_2.H_2O$ | | — | — | — | — | — | — | 22.02 | — | — | — | — |
| $CaBr_2.2H_2O$ | | — | — | — | — | — | — | — | 14.75 | — | — | — |
| $CaHPO_4.2H_2O$ | | 12.91 | — | — | — | — | — | — | — | — | — | — |
| $NH_4H_2PO_4$ | | — | 8.63 | 8.63 | 8.63 | — | — | — | 4.31 | 8.89 | — | — |
| $NH_4H_2PO_3$ | | — | — | — | — | 3.71 | — | — | — | — | — | — |
| phosphoric acid (content: 85.6%) | | — | — | — | — | — | — | 8.59 | — | — | — | — |
| phosphorous acid | | — | — | — | — | — | — | — | — | — | 6.15 | 6.15 |
| hypophosphorous acid (content: 34.5%) | | — | — | — | — | — | 14.34 | — | — | — | — | — |
| (ml) | | | | | | | | | | | | |
| methanol | | — | 140 | — | — | — | — | — | — | — | — | — |
| ethanol | | 120 | — | — | — | 100 | 100 | 120 | 160 | 120 | — | 170 |
| iso-propanol | | — | — | 120 | — | — | — | — | — | — | — | — |
| acetone | | — | — | — | 120 | — | — | — | — | — | — | — |
| nitric acid | | 10 | 10 | 10 | 10 | 5 | — | 20 | 5 | 10 | — | 5 |
| $H_2O$ | | 45 | 30 | 50 | 50 | 80 | 70 | 30 | 25 | 50 | 170 | — |
| Atomization and Thermal Decomposition Temp. (°C.) | In Flame | 850 | 920 | 800 | 930 | 710 | 790 | 920 | 1150 | 840 | — | 1040 |
| | In Heating Zone | — | — | — | — | — | — | — | — | — | 720 | — |
| Heat Treatment | Temp. (°C.) | 1000 | — | — | — | 800 | — | — | — | — | 900 | — |
| | Time (hr) | 1 | — | — | — | 2 | — | — | — | — | 2 | — |
| Main Component of Product (Note) | | HAP | HAP | HAP | HAP | HAP | HAP | HAP | (H-B)AP | HAP | HAP | HAP |

(Note) In the rank of "Product", HAP represents hydroxyapatite, CAP chloroapatite, (H-B)AP an apatite solid solution of hydroxyapatite with bromoapatite, and (H-C)AP an apatite solid solution of hydroxyapatite with chloroapatite.

EXAMPLE 18

15.58 g of $(C_2H_5O)_3P$ was added to a solution 36.90 g of $Ca(NO_3)_2.4H_2O$ dissolved in about 200 ml of ethanol, and the resulting mixture was stirred to effect dissolution thereof. Ethanol was added to the resulting solution to total 250 ml to prepare a homogeneous raw material solution. Subsequently, the raw material solution and pressurized air were supplied into a two fluid atomization nozzle from the liquid supply side and the gas supply side thereof at rates of 10 ml/min and 10 liter/min, respectively, and atomized into a flame coming from a gas burner. Fine droplets formed from the raw material solution were instantaneously heated by the solvent evaporated and burned in the flame, thereby to be thermally decomposed. The temperature during the thermal decompositon reaction was 1,050° to 1,105° C. The powder thus formed was collected by a cyclone system. It was observed as a fine powder of hollow globules through an electron microscopy. Subsequently, the formed powder was found, as a result of X-ray diffraction analysis thereof, to be one including a crystalline phase of hydroxyapatite and an amorphous phase, and a residual unreacted CaO.

EXAMPLE 19

Figure 3:
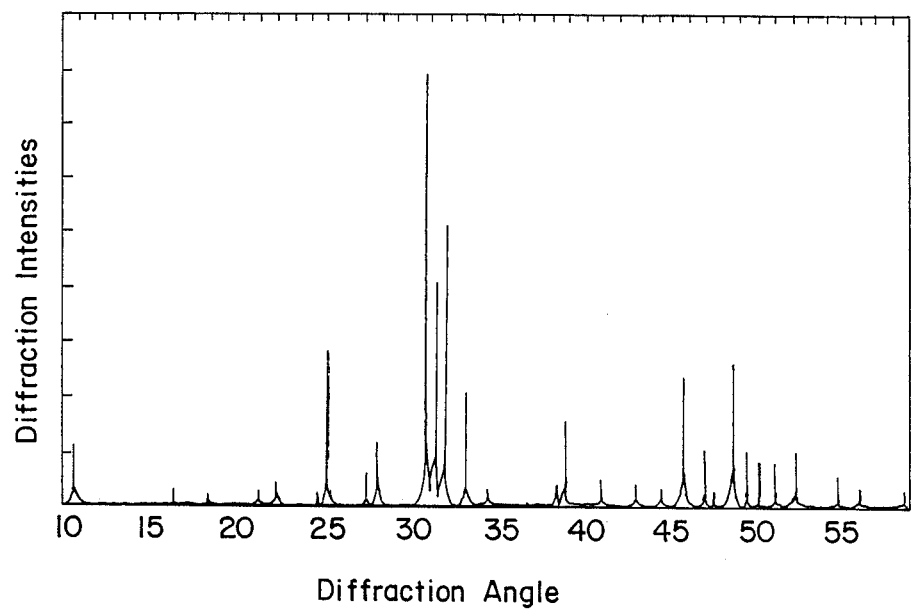
FIG. 3 is an X-ray diffraction pattern of a hydroxyapatite obtained in Example 19.

A powder as obtained by the process of Example 18 was heated up in an atmosphere of air at a rate of 5° C./min to 1,300° C., at which it was heat-treated for 1 hour, followed by cooling at a rate of 5° C./min. The results of X-ray diffraction measurement of the product obtained by the heat treatment are shown in FIG. 3. As is apparant from FIG. 3, the product obtained in this Example was a hydroxyapatite whose crystals (hexagonal) were well grown, and decompositon of which was not recognized even at high temperatures.

EXAMPLE 20

Figure 4:
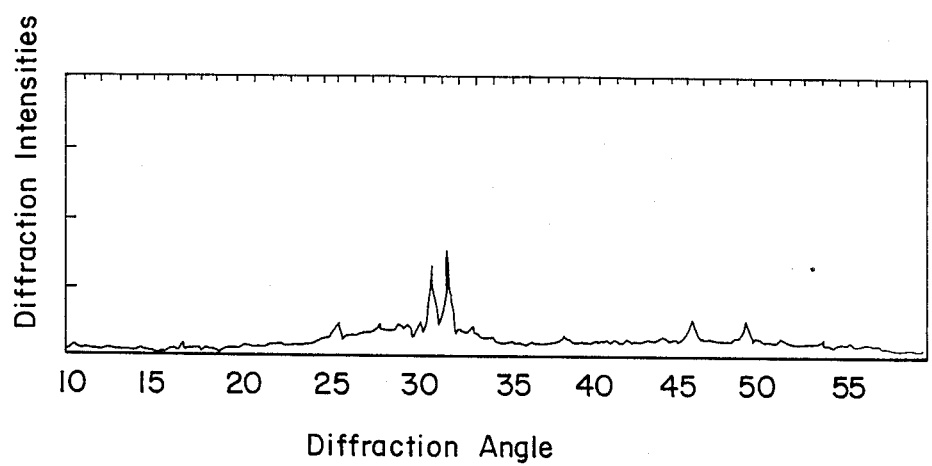
FIG. 4 is an X-ray diffraction pattern of a chloroapatite obtained in Example 20.

31.16 g of $(C_2H_5O)_3P$ was added to a solution of 45.94 g of $CaCl_2.2H_2O$ dissolved in about 200 ml of ethanol, followed by mixing by stirring to effect dissolution thereof. Ethanol was added to the resulting solution to total 250 ml to prepare a homogeneous raw material solution. Subsequently, the raw material solution was atomized and heat-decomposed in the same manner as in Example 18. The results of X-ray diffraction measurement of the resulting powder are shown in FIG. 4. As is apparent from FIG. 4, it was confirmed that the formed powder included both of a crystalline phase of chloroapatite and an amorphous phase.

EXAMPLE 21

Figure 5:
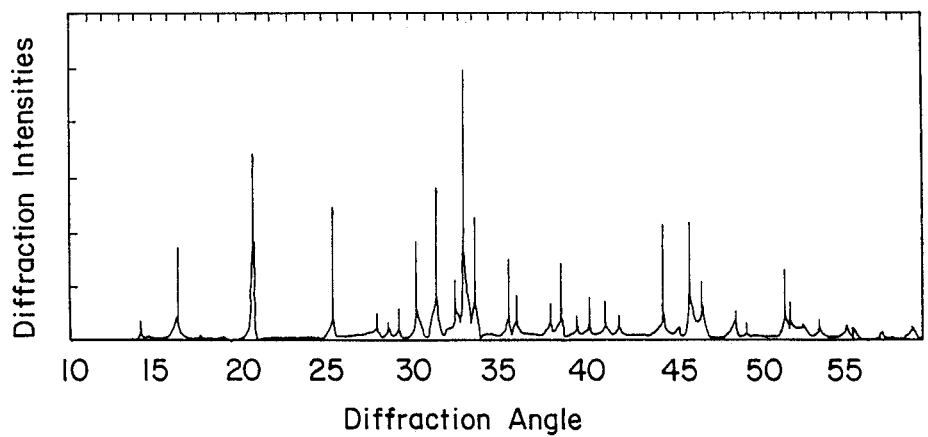
FIG. 5 is an X-ray diffraction pattern of calcium chlorophosphate obtained by a heat treatment at 800° C. in Example 21 (a).

(a): A powder as obtained by the process of Example 20 was heated up in an atmosphere of air at a rate of 5° C./min to a given temperature, at which it was then kept for 1 hour, followed by cooling at a rate of 5° C./min. In such a heat treatment process, the experiments were conducted at 400°, 600°, 800°, and 1,000° C. as that given temperature. As a result of X-ray diffraction measurement of the product heat-treated at 400° C., substantially the same diffraction pattern of chloroapatite as in FIG. 4 was obtained. The diffraction intensities were slightly larger to demonstrate growth of crystallites. On the other hand, the results of X-ray diffraction measurement of the products heat-treated at 600° and 800° C. concurred with the characteristic diffraction peaks of calcium chlorophosphate ($Ca_2PO_4Cl$) disclosed in ASTM Card 19-247. The results of X-ray diffraction measurement of the product heat-treated at 800° C. are shown in FIG. 5. As a result of X-ray diffraction measurement of the product heat-treated at 1,000° C., there was obtained a diffraction pattern in which the diffraction peak assigned to calcium chlorophosphate decreased and a diffraction line attributed to formation of chloroapatite was recognized. It was confirmed by this series of experiments that, in the course of heating, the powder including both phases, a chloroapatite phase and an amorphous phase, (powder as obtained in the process of Example 20), the chloroapatite remained as such at 400° C., changed into calcium chlorophosphate at 600° to 800° C., and changed into chloroapatite again at 1,000° C. or more.

Figure 6:
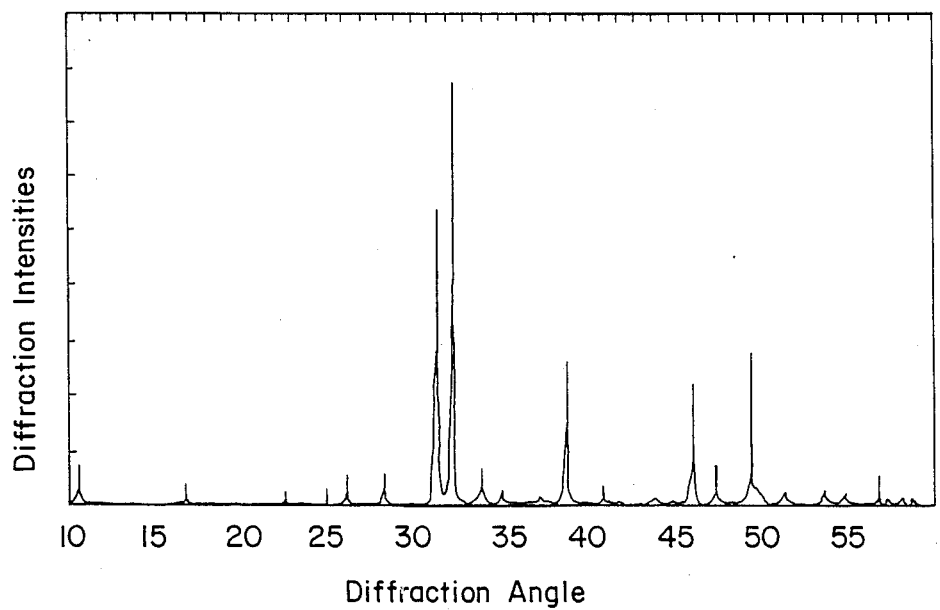
FIG. 6 is an X-ray diffraction pattern of a chloroapatite obtained in Example 21 (h).

(b) A powder as obtained in Example 20 was heated up in an atmosphere of air at a rate of 5° C./min to 1,200° C., at which it was kept for 1 hour, followed by cooling at a rate of 5° C./min. The product obtained by this treatment was dissolved in nitric acid, and subjected to a test of examining whether or not a milky turbidity is made with a silver nitrate solution, thereby to confirm formation of a silver chloride precipitate. The results of X-ray diffraction measurement of the above-mentioned product are shown in FIG. 6. As is apparant from FIG. 6, this product was chloroapatite. Main peaks consist of a diffraction peak (211) at a diffraction angle 2 $\theta$ of 31.4° and superposed diffraction peaks (112) and (300) at 2 $\theta$ of 32.3°.

EXAMPLE 22

15.58 g of $(C_2H_5O)_3P$ was added to a solution of 36.90 g of $Ca(NO_3)_2.4H_2O$ dissolved in about 180 ml of ethanol, followed by mixing by stirring to effect dissolution. Subsequently, an aqueous ammonium bromide solution prepared by dissolving 4.90 g of $NH_4Br$ in 25 ml of water was well admixed with the resulting solution, and then additionally admixed with ethanol to total 250 ml to prepare a homogeneous raw material solution. Subsequently, the raw material solution was atomized and thermally decomposed in the same manner as in Example 18. The obtained powder was heat-treated in the same manner as in Example 21. As a result of X-ray diffraction measurement of the product obtained, the same diffraction pattern of hydroxyapatite (hexagonal) as in FIG. 3 was obtained, and it included a residual peak of liberated CaO. The product was dissolved in nitric acid, and subjected to detection of bromine with a silver nitrate solution. A silver bromide precipitate was formed so that the presence of bromine was confirmed. Thus, it was understood that the product obtained in this Example was an apatite solid solution of hydroxyapatite with bromoapatite.

EXAMPLE 23

15.58 g of $(C_2H_5O)_3P$ was added to a solution of 36.87 g of $CaBr_2.2H_2O$ dissolved in about 180 ml of ethanol, followed by mixing by stirring to effect dissolution. Ethanol was added to the resulting solution to total 250 ml to prepare a homogeneous raw material solution. Subsequently, the raw material solution was atomized and thermally decomposed in the same manner as in Example 18. The resulting powder was heat-treated in the same manner as in Example 21 (b). As a result of X-ray diffraction measurement of the product obtained, the same diffraction pattern of hydroxyapatite (hexagonal) as in FIG. 6 was obtained. The presence of bromine was confirmed with a silver nitrate solution. Thus, it was understood that the above-mentioned product was bromoapatite.

EXAMPLES 24 TO 35

$Ca(NO_3)_2.4H_2O$, $CaCl_2$, $CaCl_2.2H_2O$, $CaBr_2.2H_2O$, $NH_4Cl$, $(CH_3O)_3P$, $(C_2H_5O)_3P$, $[(CH_3)_2CHO]_3P$, $[CH_3(CH_2)_3O]_3P$, $(C_6H_5O)_3P$, $(C_6H_5)_3PO$, $(C_2H_5O)_2POH$, methanol, ethanol, isopropanol, acetone, $H_2O$, etc. were used as raw materials. Raw material formulations as listed in Table 2 were prepared. They were each subjected to the procedure of atomization and thermal decomposition under the same conditions as in Example 18 except for the conditions as listed in Table 2 to synthesize various calcium-phosphorus-apatites.

TABLE 2

| Raw Material | Example | | | | | | | | | | | |
|---|---|---|---|---|---|---|---|---|---|---|---|---|
| | 24 | 25 | 26 | 27 | 28 | 29 | 30 | 31 | 32 | 33 | 34 | 35 |
| Raw Material Formulation | | | | | | | | | | | | |
| (g) | | | | | | | | | | | | |
| $Ca(NO_3)_2.4H_2O$ | 71.98 | 37.83 | 18.45 | 18.45 | 18.45 | 18.45 | 18.45 | 18.45 | — | 18.45 | 18.45 | 36.90 |
| $CaCl_2$ | — | — | — | — | — | — | — | — | 34.70 | — | — | — |
| $CaCl_2.2H_2O$ | — | — | — | — | — | — | — | — | — | 11.48 | — | — |
| $CaBr_2.2H_2O$ | — | — | — | — | — | — | — | — | — | — | 18.43 | — |
| $NH_4Cl$ | — | — | — | — | — | — | — | — | — | — | — | 2.67 |
| $(CH_3O)_3P$ | 24.20 | — | — | — | — | — | — | — | — | — | — | — |
| $(C_2H_5O)_3P$ | — | 14.90 | 7.79 | — | — | — | — | — | 31.16 | 15.58 | 15.58 | 15.58 |
| $[(CH_3)_2CHO]_3P$ | — | — | — | 9.75 | — | — | — | — | — | — | — | — |
| $[CH_3(CH_2)_3O]_3P$ | — | — | — | — | 11.72 | — | — | — | — | — | — | — |
| $(C_6H_5O)_3P$ | — | — | — | — | — | 14.53 | — | — | — | — | — | — |
| $(C_6H_5)_3PO$ | — | — | — | — | — | — | 13.03 | — | — | — | — | — |
| $(C_2H_5O)_2POH$ | — | — | — | — | — | — | — | 6.47 | — | — | — | — |
| (ml) (Note 2) | | | | | | | | | | | | |
| methanol | 250 | — | — | — | — | — | — | — | 250 | — | — | — |
| ethanol | — | 250 | — | — | 250 | 250 | 250 | 250 | — | 250 | 250 | 250 |
| iso-propanol | — | — | — | 250 | — | — | — | — | — | — | — | — |
| acetone | — | — | 250 | — | — | — | — | — | — | — | — | — |
| $H_2O$ | — | 20 | — | — | — | — | — | — | 50 | — | — | — |
| Atomization and thermal Decomposition Temp. (°C.) | 870 | 1010 | 1050 | 1120 | 1090 | 1150 | 1110 | 1060 | 950 | 1120 | 1190 | 1110 |
| Heat Treatment Temp. (°C.) | — | 1200 | — | — | 600 | — | 600 | — | 1300 | 400 | 1200 | 600 |

TABLE 2-continued

| Raw Material | Example | | | | | | | | | | | |
|---|---|---|---|---|---|---|---|---|---|---|---|---|
| | 24 | 25 | 26 | 27 | 28 | 29 | 30 | 31 | 32 | 33 | 34 | 35 |
| Heat Treatment Time (hr) | — | 1 | — | — | 2 | — | 2 | — | 1 | 2 | 1 | 2 |
| Main Component of Product (Note 1) | HAP | HAP | HAP | HAP | HAP | HAP | HAP | HAP | CAP | (H-C)AP | (H-B)AP | (H-C)AP |

(Note 1) the same as in Table 1.
(Note 2) Every figure "250" in the ranks of "alcohols and acetone" is intended to mean that an alcohol or acetone is added to provide a total amount of material solution of 250 ml.

EXAMPLE 36

A test was conducted in accordance with the following procedures (a) and (b). The effect of addition of aqueous ammonia to a raw material solution could be confirmed by the test.

(a): 11.63 g of $(CH_3O)_3P$ was admixed with a solution of 36.90 g of $Ca(NO_3)_2.4H_2O$ dissolved in about 150 ml of methanol to effect dissolution, and then admixed with 16.7 ml of aqueous ammonia (28%). Thereafter, methanol was added to the resulting mixture to total 250 ml to prepare a homogeneous raw material solution. Subsequently, the raw material solution was atomized and thermally decomposed in the same manner as in Example 18.

(b): Preparation, and atomization and thermal decomposition of a raw material solution were made under the same conditions as in the above-mentioned procedure (a) except that no aqueous ammonia was added to the raw material solution. As a result of X-ray diffraction analysis of powders formed by the procedures (a) and (b), both of the powders comprised hydroxyapatite as the main component, while the powder obtained by the procedure (a) involving addition of aqueous ammonia to the raw material solution has a main peak diffraction intensity 4 times larger than that of the powder obtained by the procedure (b). In addition to the peak assigned to hydroxylapatite, a peak assigned to CaO was scarcely recognized in the powder obtained by the procedure (a), while a clear peak assigned to CaO was recognized in the powder obtained by the procedure (b). Concerning the intensity ratio, the CaO peak diffraction intensity for the powder obtained by the procedure (a) was as low as about 1/6 of that of the powder obtained by the procedure (b). These facts demonstrate that addition of aqueous ammonia effectively increases the hydroxyapatite yield and effectively suppresses the liberation formation of CaO.

EXAMPLE 37

A powder as obtained by the process of Example 36 (a) was heated up in an atmosphere of air at a rate of 5° C./min to 600° C., at which it was then heat-treated for 2 hours, followed by cooling at a rate of 5° C./min. As a result of X-ray diffraction analysis of the product obtained by this heat treatment, there was recognized only a peak assigned to further grown hydroxyapatite, crystals of which were further grown. A peak assigned to CaO as scarcely recognized in the powder formed in Example 36 (a) disappeared and was not recognized at all.

EXAMPLES 38 TO 46

$Ca(NO_3)_2.4H_2O$, $(CH_3O)_3P$, $(C_2H_5O)_3P$, $[CH_3(CH_2)_3O]_3P$, $(C_2H_5O)_2POH$, methanol, ethanol, aqueous ammonia (28%), a 30% aqueous trimethylamine solution, triethylamine, tri-n-butylamine, etc. were used as components of raw material solutions. Raw material formulations as listed in Table 3 were prepared. They were each subjected to the procedure of atomization and thermal decomposition under the same conditions as in Example 36 except for the conditions as listed in Table 3 to synthesize hydroxyapatites. In every Example, it was confirmed that the hydroxyapatite yield increased as compared with that in the case where neither aqueous ammonia nor amine was added to the raw material solution.

TABLE 3

| Raw Material | Example | | | | | | | | |
|---|---|---|---|---|---|---|---|---|---|
| | 38 | 39 | 40 | 41 | 42 | 43 | 44 | 45 | 46 |
| Raw Material Formulation | | | | | | | | | |
| (g) | | | | | | | | | |
| $Ca(NO_3)_2.4H_2O$ | 18.45 | 18.45 | 18.45 | 36.90 | 18.45 | 18.45 | 36.90 | 36.44 | 38.34 |
| $(CH_3O)_3P$ | — | — | 5.82 | 11.63 | 5.82 | — | 11.63 | 11.87 | 10.88 |
| $(C_2H_5O)_3P$ | — | — | — | — | — | 7.79 | — | — | — |
| $[CH_3(CH_2)_3O]_3P$ | 11.72 | — | — | — | — | — | — | — | — |
| $(C_2H_5O)_2POH$ | — | 6.47 | — | — | — | — | — | — | — |
| (ml) (Note) | | | | | | | | | |
| aqueous ammonia (28%) | 16.7 | 16.7 | — | — | — | 16.7 | 8.4 | 16.7 | 16.7 |
| 30% aqueous $(CH_3)N$ solution | — | — | 50 | — | — | — | — | — | — |
| $(C_2H_5O)_3N$ | — | — | — | 35 | — | — | 17.5 | — | — |
| $[CH_3(CH_2)_3O]_3N$ | — | — | — | — | 60 | — | — | — | — |
| methanol | — | — | 250 | 250 | 250 | 250 | 250 | 250 | 250 |
| ethanol | 250 | 250 | — | — | — | — | — | — | — |
| $H_2O$ | — | — | — | — | — | 50 | — | — | — |
| Atomization and Thermal Decomposition Temp. (°C.) | 1070 | 1110 | 920 | 1000 | 1010 | 980 | 1000 | 1000 | 980 |
| Heat Treatment Temp. (°C.) | 1300 | 600 | — | — | — | 1300 | 800 | — | 1300 |
| Heat Treatment Time (hr) | 1 | 2 | — | — | — | 1 | 1 | — | 1 |

(Note) the same as mentioned at Note 2 in Table 2.

EXAMPLE 47

(1) Preparation of Fine Spheres of Hydroxyapatite $Ca(NO_3)_2.4H_2O$ and $H_3PO_4$ in such amounts as will provide an atomic ratio (Ca/P) of calcium to phosphorus of 1.67 were dissolved in methanol to prepare a solution having a whole solute concentration of 2 mol/liter. 25 ml of $HNO_3$ was added to 1 liter of the resulting solution to prepare a homogeneous solution. Subsequently, the solution was atomized into a flame coming from a gas burner at a rate of 8 ml/min (atomizing air pressure: 0.7 $kg/cm^2$) by using a two fluid atomization nozzle to cause a thermal decomposition reaction. The resulting powder was collected by a cyclone. As a result of X-ray diffraction analysis of the powder, it was found to be hydroxyapatite. As a result of scanning electron microscope (SEM) observation, it was found to be a powder including spherical particles of about 1 to 37μm. The formed powder was classified by a pneumatic classification machine to extract only regular hydroxyapatite spheres of 5 to 15 μm.

(2) Packing Pressurization Test

The hydroxyapatite particles obtained in the procedure (1) were dispersed in pure water. The resulting dispersion was subjected to a packing pressurization test under the varied pressures of 100 to 500 $kg/cm^2$ with a stainless high-performance liquid chromatography column of 4 mm in inner diameter and 250 mm in length according to the slurry packing method. After the pressurization test, the packed column was dismantled, and the packed hydroxyapatite was observed by a SEM. Deformation and destruction of the particles were not recognized even after application of a pressure as high as 500 $kg/cm^2$. The hydroxyapatite particles recovered by dismantling the packed column were subjected again to a packing test according to the same procedure and method as described above. The packing work could be made in the same way as in the first work. The hydroxyapatite particles recovered by dismantling the column were observed by a SEM to find neither deformation nor destruction thereof.

(3) Column Chromatography

The spherical hydroxyapatite particles prepared by the procedure as described in (1) were dispersed in an aqueous $NaH_2PO_4$ solution (1/10 M), and packed in a stainless column of 4 mm in inner diameter and 150 mm in length according to the slurry packing method (packing pressure: 170 $kg/cm^2$).

Egg lysozyme was subjected to a measurement with this column by using a sodium phosphate buffer solution having a pH of 6.8 according to the linear gradient method (gradient: $3.49 \times 10^{-2}$ M/ml). When the liquid flow rate was varied from 0.5 to 2.0 ml/min (3.13 to 12.5 ml/min as converted in a column of 1 cm in inner diameter), the measurement pressure varied from 19 $kg/cm^2$ (at 0.5 ml/min) to 81 $kg/cm^2$ (at 2.0 ml/min). Under various conditions, the measurement was conducted stably without any troubles such as blocking. This proves that the packing material according to the present invention is suitable for chromatography at high pressures around 80 $kg/cm^2$. This also proves that the packing material according to the present invention allows a low viscosity solution of a protein such as lysozyme to be flowed at a high flow rate of 10 ml/min or more as converted in a column of 1 cm in inner diameter, and hence provides a superior characteristic of a column packed therewith to those of conventional columns.

EXAMPLE 48

The hydroxyapatite particles prepared in Example 47 (1) were heat-treated in air at 800° C. for 2 hours. The analysis of particles obtained showed an increase in the X-ray diffraction intensity of hydroxyapatite with growth of crystals and no proof of decomposition of hydroxyapatite. No destruction of the shape of the spherical particles was also recognized in SEM observation. Subsequently, the hydroxyapatite particles thus heat-treated were packed in a stainless column of 4 mm in inner diameter and 150 mm in length by the same procedure as in Example 47 (3).

Egg lysozyme and cytochrome c were subjected to a measurement with the resulting column at random to carry out a repeated service test of the column for a total of 30 times with egg lysozyme and a total of 20 times with cytochrome c for a grand total of 50 times. Blocking or non-blocking of the column and repeatability of the retention time thereof were examined. Every measurement was carried out at a flow rate of 0.5 ml/min according to the linear gradient method using a sodium phosphate buffer solution having a pH of 6.8 (gradient: $3.49 \times 10^{-2}$ M/ml). The pressure in the measurement was 20 to 23 $kg/cm^2$. No blocking of the column occurred until the last time of the test, and very good chromatograms were obtained. As for the repeatability, a variation of the egg lysozyme retention time in the measurement was examined to find a minimum value of 22.05 minutes and a maximum value of 22.37 minutes throughout the measurement. Although this measurement was not intended to involve such severe test contents as to find the repetition accuracy and repeatability accuracy of the retention time by statistically processing the measured data, the variation was within 2% as the common yardstick of evaluation of the repeatability as described in manuals or the like concerning liquid chromatography, thus proving that the column used in the measurement had a high repeatability. After the repetition test, the column was dismantled to carry out SEM observation of the spherical particles of hydroxyapatite. None of abnormalities such as deformation and destruction of the particles were recognized.

EXAMPLE 49

$Ca(NO_3)_2.4H_2O$ and $H_3PO_4$ in such amounts as will provide an atomic ratio of calcium to phosphorus of 1.67 were dissolved in 2-methoxyethanol to prepare a solution having a whole solute concentration of 1.0 mol/liter. The solution was subjected to fast thermal decomposition of atomized solution in the same manner as in the process of fast thermal decomposition of atomized solution as performed in Example 47 (1) to obtain a product which was in the form of a mixture of spherical hydroxyapatite particles of 1 to 6 μm and clumpy hydroxyapatite particles consisting of aggregates of fine crystals. The product was classified by a pneumatic classification machine to extract only spherical hydroxyapatite particles of 3 to 6 μm. The spherical hydroxyapatite particles thus obtained by classification were packed in a stainless column (inner diameter: 4 mm, length: 100 mm) under 400 $kg/cm^2$ by the slurry packing method. A test evaluation of them as a packing material was carried out in the same manner as in Example 48. The hydroxyapatite packing material obtained in this Example provided good results of mechanical strength, durability, and repeatability as in Example 48.

EXAMPLE 50

A solution of 220.25 g of $Ca(CH_3COO)_2.H_2O$ dissolved in 450 ml of 6N $HNO_3$ was mixed with a solution of 85.85 g of $H_3PO_4$ (content:85.6%) dissolved in 300 ml of methanol to prepare a homogeneous solution. The solution was subjected to fast thermal decomposition of atomized solution in the same manner as in Example 47 (1) to obtain spherical hydroxyapatite particles of about 1 to 25 μm. The product was classified by a pneumatic classification machine to extract hydroxyapatite particles of 5 to 15 μm, which were then heat-treated at 600° C. for 2 hours. Subsequently, column packing and a liquid chromatography evaluation test were effected in the same manner as in Example 49.

The hydroxyapatite particles obtained in this Example did not have as regularly spherical a shape as the particles obtained in Example 49, and included some distorted or uneven spheres. However, the same results as in Example 49 were obtained for the chromatographic properties.

EXAMPLE 51

$Ca(NO_3)_2.4H_2O$ and $(C_2H_5O)_3P$ in such amounts as will provide an atomic ratio of calcium to phosphorus of 1.67 were dissolved in ethanol to prepare a solution having a whole solute concentration of 1 mol/liter. 500 ml of the solution was admixed with 34 ml of aqueous ammonia (concentration: 28%) to prepare a homogeneous solution. Subsequently, the solution was subjected to fast thermal decompositon of atomized solution in the same manner as in Example 47 (1) to obtain a product consisting of spherical hydroxyapatite particles of about 1 to 8 μm. the product was heat-treated at 800° C. for 1 hour, and then packed in a stainless column of 4 mm in inner diameter and 50 mm in length under a packing pressure of 500 kg/cm$^2$ by the same slurry packing method as in Example 47 (3).

Figure 7:
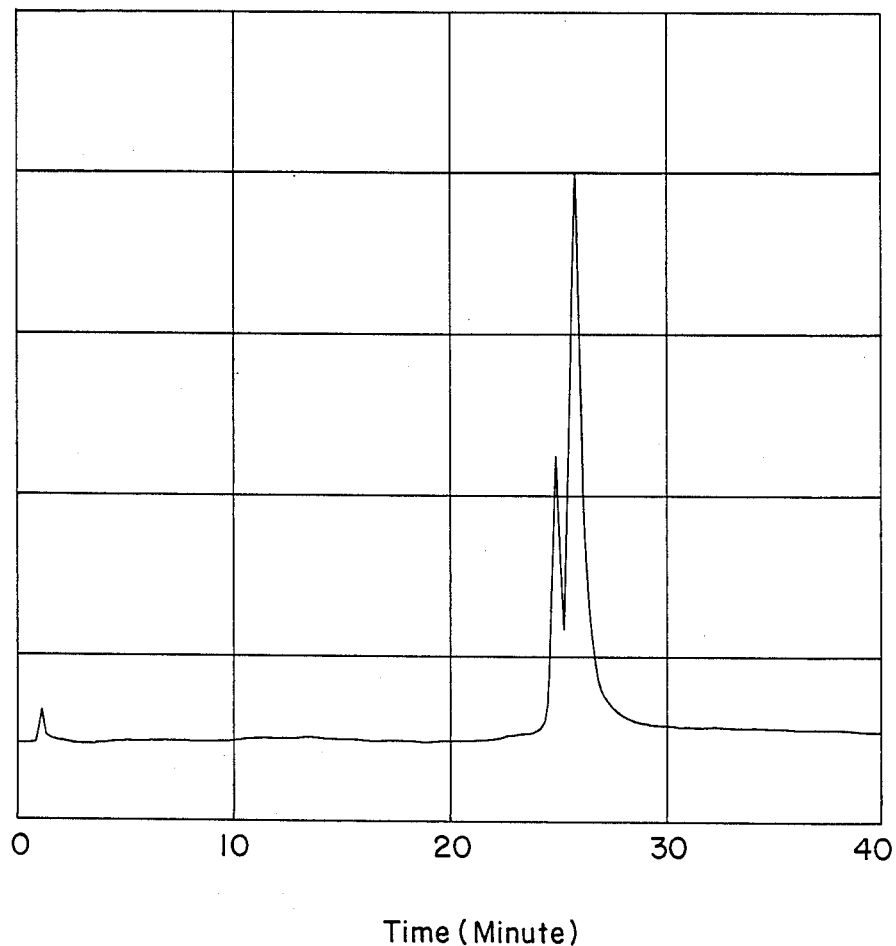
FIG. 7 is a diagram showing a chromatogram of cytochrome c obtained using a chromatographic packing material according to the present invention, which is obtained by an example of the process of the present invention (Example 51).

Cytochrome c was subjected to a measurement with the resulting column and with a sodium phosphate buffer solution having a pH of 6.8 at a liquid flow rate of 0.5 ml/min according to the linear gradient method (gradient: $3.49 \times 10^{-2}$ M/ml). The chromatogram in the measurement is shown in FIG. 7. In view of the fact that cytochrome c includes at least two kinds of molecular species, one of which contains an iron atom in an oxidized state, and another one of which contains an iron atom in a reduced state, two mutually clearly separated peaks in FIG. 7 are believed to be assigned to these molecular species (the left peak assigned to the oxidized form of molecules and the right peak assigned to the reduced form of molecules), thus proving that the column in this Example has a high separating capacity.

EXAMPLE 52

$Ca(NO_3)_2.4H_2O$ and $H_3PO_4$ in such amounts as will provide an atomic ratio of calcium to phosphorus of 1.67 were dissolved in methanol to prepare a solution having a whole solute concentration of 0.5 mol/liter. The solution was subjected to fast thermal decomposition of atomized solution in the same manner as in Example 47 (1) to obtain a product consisting of spherical hydroxyapatite particles of about 1 to 9 μm. The product was heat-treated at 600° C. for 2 hours, and then packed in a 50 mm column in the same manner as in Example 51. Cytochrome c was subjected to measurement with the resulting column in the same manner as in Example 51. The separating capacity of the column was as high as in Example 51.

EXAMPLE 53

$Ca(NO_3)_2.4H_2O$ and $(CH_3O)_3P$ in such amounts as will provide an atomic ratio of calcium to phosphorus of 1.67 were dissolved in methanol to prepare a solution having a whole solute concentration of 1 mol/liter. 1 liter of the solution was admixed with 68 ml of aqueous ammonia (concentration: 28%) to prepare a homogeneous solution. Subsequently, the solution was subjected to fast thermal decompositon of atomized solution in the same manner as in Example 47 (1) to obtain a product consisting of spherical hydroxyapatite particles of about 0.5 to 5 μm. The product was classified by a pneumatic classification machine to remove particles of 1 μm or less. The residual product was then packed in a stainless column of 4 mm in inner diameter and 30 mm in length under a packing pressure of 500 kg/cm$^2$ by the same slurry packing method as in Example 47 (3).

Lysozyme was subjected to a measurement with the resulting column under the same conditions as in Example 51. It was found that the hydroxyapatite packing material obtained in this Example had good chromatographic properties such as mechanical strength and repeatability as in Example 48.

EXAMPLE 54

A solution having a whole solute concentration of 0.5 mol/liter was prepared in substantially the same manner as in Example 53 except that $(C_2H_5O)_2POH$ and ethanol were used as the phosphorus compound and the organic solvent, respectively. The solution was subjected to fast thermal decomposition of atomized solution to obtain a product consisting of spherical hydroxyapatite particles of about 0.5 to 3 μm in size. Classification, packing, and measurement of the product were made in the same manner as in Example 53. As a result, good chromatographic properties as in Example 53 were secured.

EXAMPLE 55

$CaBr_2.2H_2O$ and phosphorous acid in such amounts as will provide an atomic ratio of calcium to phosphorus of 1.67 were dissolved in methanol to prepare a solution having a whole solute concentration of 1 mol/liter. The solution was then subjected to fast thermal decomposition of atomized solution in the same manner as in Example 47 (1) to obtain spheres of about 0.5 to 5 μm in size in the form of an apatite solid solution of bromoapatite with hydroxyapatite. The product was heat-treated at 300° C. for 1 hour, and then packed in a 50 mm column in the same manner as in Example 51. Cytochrme c was subjected to a measurement with the resulting column in the same manner as in Example 51. The obtained chromatogram showed that the separating capacity of the column was as high as in Example 51.

EXAMPLE 56

$Ca(NO_3)_2.4H_2O$ and phosphoric acid in such amounts as will provide an atomic ratio (Ca/P) of calcium to phosphorus of 1.67 were dissolved in a solution prepared by adding 40 ml of $HNO_3$ and 150 ml of $CH_3COOH$ to 1 liter of a mixed solvent of methanol and water (6:1) to prepare a solution having a whole solute concentration of 2 mol/liter. The raw material solution was subjected to fast thermal decomposition of atomized solution in the same manner as in Example 47 (1). The resulting powder was heat-treated in air at 1,000° C. for 1 hour. The subsequent SEM observation of the resulting product revealed a sintered body consisting of hollow particles having a spherical hull network structure of 5 to 26 μm as a whole which was formed by a network-like connection of hydroxyapatite grains of 0.2 to 0.4 μm as well as broken pieces thereof. The powder thus heat-treated was then subjected to a pulverization treatment with a miniature test sample mill. It was capable of being pulverized into hydroxyapatite grains of about 0.4 μm.

What is claimed is:

1. A calcium-phosphorus-apatite product prepared by the process comprising:
   (a) admixing a solvent system with a calcium compound and a phosphorus compound soluble in said solvent system to prepare a raw material solution, said solvent system being water, or an organic solvent compatible with water or a mixture of water and an organic solvent compatible with water;
   (b) atomizing said raw material solution in a flame or heating zone at a temperature sufficient to effect thermal decomposition of said raw material solution; and
   (c) recovering the thus produced calcium-phosphorus-apatite product.

2. A calcium-phosphorus-apatite product prepared by the process comprising:
   (a) admixing a solvent system with a calcium compound and a phosphorus compound soluble in said solvent systems to prepare a raw material solution, said solvent system being water, or an organic solvent compatible with water or a mixture of water and an organic solvent compatible with water;
   (b) atomizing said raw material solution in a flame or heating zone at a temperature sufficient to effect thermal decomposition of said raw material solution;
   (c) heat-treating the resultant powder; and
   (d) recovering the thus produced calcium-phosphorus-apatite product.

3. A product according to claim 1 or 2, wherein said calcium compound is an inorganic calcium compound and said phosphorus compound is an inorganic phosphorus compound, and an acid is admixed with said solvent system for effecting dissolution of said calcium and phosphorus compounds to prepare an acidic raw material solution.

4. A product according to claim 1 or 2, wherein said calcium compound is an inorganic calcium compound and said phosphorus compound is an organic phosphorus compound, and at least one member selected from ammonium chloride and ammonium bromide is admixed with said solvent system.

5. A product according to claim 1 or 2, wherein said calcium compound is an inorganic calcium compound and said phosphorus compound is an organic phosphorus compound, and at least one member selected from aqueous ammonium and an amine is admixed with said solvent system.

6. A product according to claim 1 or 2, wherein said calcium and phosphorus compounds are selected from the group consisting of $Ca(NO_3)_2.4H_2O$; $Ca(CH_3COO)_2.2H_2O$; $CaCl_2.H_2O$; $CaBr_2.2H_2O$; $CaHPO_4.2H_2O$; $NH_4H_2PO_4$; $NH_4H_2PO_3$; $NH_4H_2PO_2$, $H_3PO_4$; $H_3PO_3$; and $H_3PO_2$.

7. A product according to claim 3, wherein said acid is nitric acid or hydrochloric acid.

8. A product according to claim 1 or 2, wherein said phosphorus compound is an organic phosphorus compound selected from the group consisting of $(CH_3O)_3P$; $(C_2H_5O)_3P$; $[(CH_3)_2CHO]_3P$; $[CH_3(CH_2)_3O]_3P$; $(C_6H_5)_3P$; $(C_2H_5O)_2POH$ and $(C_6H_5)_3PO$.

9. A product according to claim 1 or 2, wherein said raw material composition has an atomic ratio of Ca/P of calcium to phosphorus of 1.60 to 1.85.

10. A product according to claim 2, wherein said heat treatment is conducted at a temperature of about 1,000° to 1,300° C.

11. A calcium-phosphorus-apatite product according to claim 1 or 2, which is in the form of spherical particles.

12. A calcium-phosphorus-apatite product according to claim 1 or 2, wherein the atomic ratio Ca/P of calcium to phosphorus is about 5/3.

13. A process for the preparation of calcium-phosphorus-apatite comprising:
   (a) admixing a solvent system with a calcium compound and a phosphorus compound soluble in said solvent system to prepare a raw material solution, said solvent system being water, or an organic solvent compatible with water or a mixture of water and an organic solvent compatible with water;
   (b) atomizing said raw material solution in a flame or heating zone at a temperature sufficient to effect thermal decomposition of said raw material solution; and
   (c) recovering the produced calcium-phosphorus-apatite product.

14. A process for the preparation of a calcium-phosphorus-apatite comprising:
   (a) admixing a solvent system with a calcium compound and a phosphorus compound soluble in said solvent systems to prepare a raw material solution, said solvent system being water, or an organic solvent compatible with water or a mixture of water and an organic solvent compatible with water;
   (b) atomizing said raw material solution in a flame or heating zone at a temperature sufficient to effect thermal decomposition of said raw material solution;
   (c) heat-treating the resultant powder; and
   (d) recovering the produced calcium-phosphorus-apatite product.

15. A process according to claim 13 or 14, wherein said calcium compound is an inorganic calcium compound and said phosphorus compound is an inorganic phosphorus compound, and an acid is admixed with said solvent system for effecting dissolution of said calcium and phosphorus compounds to prepare an acidic raw material solution.

16. A process according to claim 13 or 14, wherein said calcium compound is an inorganic calcium compound and said phosphorus compound is an organic phosphorus compound, and at least one member selected from ammonium chloride and ammonium bromide is admixed with said solvent system.

17. A process according to claim 13 or 14, wherein said calcium compound is an inorganic calcium compound and said phosphorus compound is an organic phosphorus compound, and at least one member selected from aqueous ammonium and an amine is admixed with said solvent system.

18. A process according to claim 13 or 14, wherein said calcium and phosphorus compounds are selected from the group consisting of $Ca(NO_3)_2.4H_2O$; $Ca(CH_3COO)_2.2H_2O$; $CaCl_2.H_2O$; $CaBr_2.2H_2O$; $CaHPO_4.2H_2O$; $NH_4H_2PO_4$; $NH_4H_2PO_3$; $NH_4H_2PO_2$, $H_3PO_4$; $H_3PO_3$; and $H_3PO_2$.

19. A process according to claim 15, wherein said acid is nitric acid or hydrochloric acid.

20. A process according to claim 13 or 14, wherein said phosphorus compound is an organic phosphorus compound selected from the group consisting of $(CH_3O)_3P$; $(C_2H_5O)_3P$; $[(CH_3)_2CHO]_3P$; $[CH_3(CH_2)_3O]_3P$; $(C_6H_5)_3P$; $(C_2H_5O)_2POH$ and $(C_6H_5)_3PO$.

21. A process according to claim 14, wherein said heat treatment is conducted at a temperature of about 1,000° to 1,300° C.

* * * * *